Patented Feb. 19, 1929.

1,702,589

UNITED STATES PATENT OFFICE.

LINN BRADLEY, OF MONTCLAIR, NEW JERSEY, AND EDWARD P. McKEEFE, OF NEW YORK, N. Y., ASSIGNORS TO BRADLEY-McKEEFE CORPORATION, OF NEW YORK, N. Y., A CORPORATION OF NEW YORK.

PRODUCTION OF CAUSTIC ALKALI AND OTHER PRODUCTS.

No Drawing. Application filed November 5, 1921, Serial No. 513,162. Renewed May 5, 1927.

This invention relates to the production of caustic alkalis, and more particularly to the production of caustic alkalis from alkali-metal sulfites and from products produced therefrom. The invention also includes improvements in the production of furnace products containing alkali-metal carbides, and in the production of acetylene, as well as caustic alkalis, therefrom.

According to the present invention a solution of alkali-metal sulfite is digested with a cellulose-bearing material, such as wood, until the interaction between the alkali-metal sulfite and the non-cellulose constituents of the wood results in the solution of the non-fibrous material and produces a residual liquor containing the soluble products of interaction of the alkali-metal sulfite upon certain of the wood constituents. The residual liquor is then separated from the fibrous material, evaporated to dryness and the dried product is calcined and the calcined product, with added carbonaceous material if required, heated to a sufficient temperature to form a furnace product containing some alkali-metal carbide. The furnace product containing carbide may be treated, for example, by subjecting it to the action of steam in regulated amount and under properly regulated conditions whereby the steam will react with the carbide to produce acetylene, or acetylene with other combustible gases, and caustic alkali.

The invention may be further illustrated by the following more detailed description, but it is intended and will be understood that the invention is illustrated by but is not limited to these specific examples so described.

A solution of normal sodium sulfite ($Na_2SO_3$) is digested with chipped wood, for example, poplar or spruce wood or other coniferous or deciduous wood, using about 30%–40% of the sodium sulfite ($Na_2SO_3$) based on the air-dried weight of the wood, and using a sufficient amount of water so that the wood chips are covered by the sodium sulfite solution. The digestion may be carried out by heating with direct steam at a steam pressure varying from about 110 to 140 pounds, and the digestion can be continued for a suitable period of time, for example, from ten to three hours, or until the wood fibres are substantially freed from non-fibrous constituents. As a result of the digestion above described, the cellulosic material itself (i. e. the wood) is in part utilized in reacting with or combining with some of the sodium sulfite, while a part of the wood is converted into a high grade pulp which is thus produced as one of the valuable products of the complete process.

The residual liquors produced by the digestion above described will contain large amounts of organic compounds, a greater or less portion of which will be sodium-organic compounds or sodium-sulfo-organic compounds. The liquor may also contain unchanged sodium sulfite as well as other products. These liquors have a characteristic composition and they seem to contain considerable amounts of organic acids or readily oxidizable compounds, which, on oxidation, yield organic acids. These organic acids or acid-forming compounds, when the liquor is concentrated and evaporated to dryness, seem to react upon the sodium sulfite of the solution and other sulfur-containing compounds so that the greater part of the sulfur dioxide of the sodium sulfite employed is set free and driven off. Also some carbon disulfide may be formed and thus remove some sulfur compounds in this way.

The evaporation of the solution may be carried out in different ways. The solution may, for example, be evaporated in a multiple effect evaporator until it has a specific gravity of about 40–60° Tw. and the concentrated liquor then fed into a rotary furnace such as is commonly used in the calcination of concentrated black liquor produced by the soda pulp process. The rotary furnace may be heated, for example, by means of a coal fire at the lower end, that is, at the discharge end, and the hot gases from the furnace may be utilized for heating or the generation of steam in a boiler.

The dry product resulting from the evaporation, and preferably after it has been preliminarily calcined to drive off volatile organic matter such as results from destructive distillation, together with added carbonaceous material if desired, is heated in an electric furnace to a sufficient temperature to convert a part at least of the sodium contained in the mixture into sodium carbide. The furnace may be similar to that used in the manufacture of calcium carbide. The heating of the electric furnace can be regulated and controlled and a greater or less portion of the sodium content of the charge converted into sodium carbide.

The furnace product sodium carbide thus produced requires careful handling. One advantageous method of utilizing the furnace product containing sodium carbide, after it has been cooled, is to subject it to the action of a regulated current of steam which will react therewith to form caustic soda and a valuable illuminating gas, viz., acetylene. The steam used in treating the furnace product containing sodium carbide should not be admixed with air or carbon dioxide which might react either with the acetylene to form an explosive mixture, or with the caustic soda to form sodium carbonate. By properly regulating the action of the steam upon the furnace product containing sodium carbide, danger of explosion can be avoided or minimized, while the caustic soda may be produced in a concentrated state. If the steam acts upon the furnace product containing sodium carbide at a temperature such that condensation of water does not take place, caustic soda may be produced in a dry form. The caustic soda can be extracted from any accompanying insoluble constituents and thus be obtained in the form of a concentrated solution if desired. The combustible gas produced can be recovered and utilized for heating or illuminating purposes.

It will thus be seen that the present invention involves the production of sodium carbide and caustic soda from sodium sulfite by a process in which the sodium sulfite is subjected to the action of a cellulose-bearing material such as wood, with the production of pulp as one product and a residual liquor as the other, which residual liquor may then be evaporated, calcined and heated in an electric furnace for the production of furnace product containing sodium carbide, which, in turn, is treated with steam for the production of caustic soda. From another standpoint, it may be considered that the invention involves the treatment of the residual liquors produced from a pulp-making operation in which the wood or other cellulose-bearing material is digested with a solution of alkali-metal sulfite as the cooking liquor, and in which the residual liquor is treated in the manner above described.

Instead of using sodium sulfite in the process, potassium sulfite or a mixture of sodium and potassium sulfites can be similarly used.

Also acid sodium or potassium sulfite cooking liquor may be treated with wood, according to the usual acid sulfite process, the residual liquor being evaporated with or without neutralization and the dried product heated to decompose the organic compounds and obtain alkali-metal carbonate, which can then be treated for the production of carbide.

We claim:

1. The method of producing caustic alkali from alkali-metal sulfites which comprises digesting a solution of the alkali-metal sulfite with a cellulose-bearing material and thereby producing a pulp and a resulting liquor, evaporating the solution to dryness and calcining and heating the resulting product to produce a furnace product containing alkali-metal carbide therefrom, and treating the said furnace product with water for the production of caustic soda.

2. The method of producing caustic soda from the residual liquor resulting from the cooking of a cellulose bearing material with a solution of a normal alkali metal sulfite, which comprises evaporating said liquor and heating the dry product in an electric furnace to produce a furnace product containing alkali metal carbide, and treating the said furnace product with water in the form of steam to produce caustic alkali therefrom.

3. The method of producing a furnace product containing alkali-metal carbide from the residual liquor resulting from the cooking of a cellulose-bearing material with a solution of an alkali-metal sulfite, which comprises evaporating such liquor and heating the dry product in an electric furnace to produce a furnace product containing alkali-metal carbide.

4. The method of producing caustic alkali from a furnace product containing alkali-metal carbide, which comprises treating the same with a current of steam in regulated amount and thereby gradually producing caustic alkali from the furnace product containing alkali-metal carbide.

5. In a process for producing an alkali-metal hydroxide, the steps which include digesting wood with a cooking liquor, of suitable composition and properties and including a substantial amount of a sulfite of an alkali-metal, under conditions adapted to yield a residual liquor which upon evaporation and incineration in a furnace of the rotary type such as is employed in working up black liquors of the conventional soda process, is capable of yielding to the furnace gases the greater amount of the sulfur originally combined with the alkali-metal in the cooking liquor when charged into the digester, separating residual liquor from resulting fibrous material, removing water from residual liquor and furnacing the residue under conditions adapted to form furnace gases which carry the greater amount of the sulfur present in the cooking liquor as a sulfite of an alkali-metal and under conditions adapted to yield a furnace product including alkali-metal compounds of which a preponderating amount is an alkali-metal carbonate, and treating such furnace product to produce an alkali-metal hydroxide.

6. In a process for producing an alkali-metal hydroxide, the steps which include digesting wood with a cooking liquor, of suitable composition and properties and including sulfur-bearing compounds of which at least one half of the sulfur is present as a sulfite of an alkali-metal, under conditions adapted to yield a residual liquor which upon evaporation and incineration in a furnace of the rotary type such as is employed in working up black liquors of the conventional soda process, is capable of yielding to the furnace gases the greater amount of the sulfur combined with alkali-metal in the cooking liquor when charged into the digester, separating residual liquor from resulting fibrous material, removing water from residual liquor and furnacing the residue under conditions adapted to form furnace gases which carry the greater amount of the sulfur present in the cooking liquor as a sulfite of an alkali-metal and under conditions adapted to yield a furnace product including alkali-metal compounds of which a preponderating amount is an alkali-metal carbonate, and treating such furnace product to produce an alkali-metal hydroxide.

7. In a process for producing an alkali-metal hydroxide, the steps which include digesting cellulose-bearing material with an alkali-metal monosulfite-containing cooking liquor, under conditions adapted to yield a residual liquor which upon evaporation and incineration in a furnace of the rotary type such as is employed in working up black liquors of the conventional soda process, is capable of yielding to the furnace gases the greater amount of the sulfur of the alkali-metal sulfite in the cooking liquor when charged into the digester, separating residual liquor from resulting fibrous material, removing water from residual liquor and furnacing the residue under conditions adapted to form furnace gases which carry the greater amount of the sulfur present in such cooking liquor as a sulfite of an alkali-metal and under conditions adapted to yield a furnace product including alkali-metal compounds of which a preponderating amount is an alkali-metal carbonate, and treating such furnace product to produce an alkali-metal hydroxide.

8. In a process for producing sodium hydroxide, the steps which include digesting wood by means of a cooking liquor containing about 30% to 40% of sodium monosulfite ($Na_2SO_3$) based on the air-dried weight of the wood, when charged into the digester and continuing the digesting treatment until the wood fibres are substantially freed from non-fibrous organic constituents of the wood, separating resulting residual liquor from resulting fibrous material, removing water from such residual liquor and furnacing the residue under conditions adapted to yield a furnace product containing a sulfur-free sodium compound and treating such furnace product to produce sodium hydroxide.

9. In a process for producing sodium hydroxide, the steps which include digesting wood by means of a cooking liquor containing about 30% to 40% of sodium monosulfite ($Na_2SO_3$) based on the air-dried weight of the wood, when charged into the digester and continuing the digesting treatment until the wood fibres are substantially freed from non-fibrous organic constituents of the wood, separating resulting residual liquor from resulting fibrous material, removing water from such residual liquor and furnacing the residue under conditions adapted to yield a furnace product containing a sulfur-free sodium compound and treating such furnace product to produce sodium hydroxide, such treatment including the steps of forming sodium carbide and decomposing the sodium carbide to form sodium hydroxide.

10. In a process for producing sodium hydroxide, the steps which include digesting wood by means of a cooking liquor containing about 30% to 40% of sodium monosulfite ($Na_2SO_3$) based on the air-dried weight of the wood, when charged into the digester, and continuing the digesting treatment until the wood fibres are substantially freed from non-fibrous organic constituents of the wood, separating resulting residual liquor from resulting fibrous material, removing water from such residual liquor and furnacing the residue under conditions adapted to yield a furnace product containing a sulfur-free sodium compound, at least a part of the furnacing treatment being carried out under conditions in which a current of hot gases is brought into intimate contact with the material undergoing treatment, and treating such furnace product to produce sodium hydroxide.

11. In a process for producing sodium hydroxide, the steps which include digesting wood with a cooking liquor containing about 30% to 40% of sodium monosulfite ($Na_2SO_3$) based on the air-dried weight of the wood until the wood fibres are substantially freed from non-fibrous constituents, separating resulting residual liquor from resulting fibrous material, removing water from such residual liquor and furnacing the residue under conditions adapted to form furnace gases which carry the greater amount of the sulfur present in such cooking liquor as sodium monosulfite when charged into the digester and under conditions adapted to yield a furnace product including sodium compounds, and treating such furnace product to produce sodium hydroxide.

12. In a process for producing sodium hydroxide, the steps which include digesting wood with a cooking liquor containing about 30% to 40% of sodium monosulfite ($Na_2SO_3$) based on the air dried weight of the wood until the wood fibres are substantially freed from non-fibrous constituents, separating resulting residual liquor from resulting fibrous material, removing water from such residual liquor and furnacing the residue under conditions adapted to form furnace gases which carry the greater amount of the sulfur present in such cooking liquor as sodium monosulfite when charged into the digester and under conditions adapted to yield a furnace product including sodium compounds, the furnacing of the residue being carried out in a furnace of the rotary type such as is commonly employed in working up black liquor of the conventional soda process, and a current of hot gases being passed through such furnace during the furnacing treatment, and treating such furnace product to produce sodium hydroxide.

13. In a process for producing an alkali-metal hydroxide, the steps which include digesting wood with a cooking liquor, of suitable composition and properties and including a substantial amount of a sulfite of an alkali-metal, under conditions adapted to yield a residual liquor which upon evaporation and incineration in a furnace of the rotary type such as is employed in working up black liquors of the conventional soda process, is capable of yielding to the furnace gases the greater amount of the sulfur originally combined with the alkali-metal in the cooking liquor when charged into the digester, separating residual liquor from resulting fibrous material, removing water from residual liquor and furnacing the residue under conditions adapted to form furnace gases which carry the greater amount of the sulfur present in the cooking liquor as a sulfite of an alkali-metal and under conditions adapted to yield a furnace product including alkali-metal compounds of which a preponderating amount is an alkali-metal carbonate, and treating such furnace product to produce an alkali-metal hydroxide, such treatment including heating the furnace product to produce alkali-metal carbide therefrom and treatment of the furnace product containing such carbide with water for the production of caustic soda.

14. In a process for producing sodium hydroxide, the steps which include digesting wood with a cooking liquor containing about 30% to 40% of sodium monosulfite ($Na_2SO_3$) based on the air dried weight of the wood until the wood fibres are substantially freed from non-fibrous constituents, separating resulting residual liquor from resulting fibrous material, removing water from such residual liquor and furnacing the residue under conditions adapted to form furnace gases which carry the greater amount of the sulfur present in such cooking liquor as sodium monosulfite when charged into the digester and under conditions adapted to yield a furnace product including sodium compounds, the furnacing of the residue being carried out in a furnace of the rotary type such as is commonly employed in working up black liquor of the conventional soda process, and a current of hot gases being passed through such furnace during the furnacing treatment, and treating such furnace product to produce sodium hydroxide, such treatment including heating the furnace product to produce alkali-metal carbide therefrom and treatment of the furnace product containing such carbide with water for the production of caustic soda.

In witness whereof, we have hereunto affixed our signatures.

LINN BRADLEY.
EDWARD P. McKEEFE.